US012152119B2

(12) United States Patent
Han et al.

(10) Patent No.: US 12,152,119 B2
(45) Date of Patent: *Nov. 26, 2024

(54) INFRARED ATTENUATION AGENT BLENDS

(71) Applicant: Owens Corning Intellectual Capital, LLC, Toledo, OH (US)

(72) Inventors: Xiangmin Han, Stow, OH (US); Nigel Ravenscroft, Hudson, OH (US); Jose Mendez-Andino, Columbus, OH (US); Chase J. Boudreaux, Canton, OH (US); Yadollah Delaviz, Lewis Center, OH (US); John R. Green, Alexandria, OH (US); Heather Alspaugh, Pickerington, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/452,646

(22) Filed: Aug. 21, 2023

(65) Prior Publication Data

US 2024/0052123 A1   Feb. 15, 2024

Related U.S. Application Data

(60) Continuation of application No. 17/978,586, filed on Nov. 1, 2022, now Pat. No. 11,780,980, which is a division of application No. 17/160,690, filed on Jan. 28, 2021, now Pat. No. 11,499,026, which is a division of application No. 16/105,004, filed on Aug. 20, 2018, now Pat. No. 10,934,409.

(60) Provisional application No. 62/547,212, filed on Aug. 18, 2017.

(51) Int. Cl.
*C08J 9/00* (2006.01)
*C08J 9/12* (2006.01)
*C08J 9/14* (2006.01)
*E04B 1/76* (2006.01)

(52) U.S. Cl.
CPC ............ *C08J 9/0066* (2013.01); *C08J 9/122* (2013.01); *C08J 9/141* (2013.01); *C08J 9/142* (2013.01); *C08G 2110/0025* (2021.01); *C08J 2201/03* (2013.01); *C08J 2203/06* (2013.01); *C08J 2203/12* (2013.01); *C08J 2203/142* (2013.01); *C08J 2203/182* (2013.01); *C08J 2205/044* (2013.01); *C08J 2205/10* (2013.01); *C08J 2325/06* (2013.01); *E04B 2001/7691* (2013.01)

(58) Field of Classification Search
CPC ...... C08J 9/0066; C08J 9/122; C08J 2325/06; C08J 2201/03; C08J 2205/10; C08J 9/141; C08J 2203/12; C08J 2203/182; C08J 2203/06; C08J 2203/144; C08J 2205/044; C04B 2001/7691

See application file for complete search history.

(56) References Cited

U.S. PATENT DOCUMENTS

| | | | |
|---|---|---|---|
| 8,323,787 B2 | 12/2012 | Delaviz et al. | |
| 8,754,142 B2 | 6/2014 | Delaviz et al. | |
| 8,754,143 B2 | 6/2014 | Delaviz et al. | |
| 8,759,409 B2 | 6/2014 | Kmmet et al. | |
| 9,005,745 B2 | 4/2015 | Annan et al. | |
| 10,053,549 B2 | 8/2018 | Annan et al. | |
| 2004/0051191 A1* | 3/2004 | Loh | C08J 9/32 264/4 |
| 2005/0247917 A1 | 11/2005 | Loyd et al. | |
| 2008/0242752 A1 | 10/2008 | Delaviz et al. | |
| 2009/0130451 A1 | 5/2009 | Farrell | |
| 2010/0331433 A1 | 12/2010 | Annan et al. | |
| 2011/0189461 A1 | 8/2011 | Delaviz et al. | |
| 2013/0040122 A1* | 2/2013 | Annan | C08J 9/0061 428/220 |
| 2013/0052393 A1 | 2/2013 | Hahn et al. | |
| 2013/0225704 A1 | 8/2013 | Delaviz et al. | |
| 2014/0316020 A1 | 10/2014 | Han et al. | |
| 2015/0337103 A1* | 11/2015 | Igualada | C08J 9/0061 521/85 |
| 2016/0009886 A1 | 1/2016 | Han et al. | |
| 2018/0223063 A1 | 8/2018 | Vo et al. | |

FOREIGN PATENT DOCUMENTS

| | | |
|---|---|---|
| EP | 620246 B1 | 1/1999 |
| EP | 2010601 B1 | 11/2009 |
| EP | 2602285 A2 | 6/2013 |
| JP | 2013221110 A | 10/2013 |

(Continued)

OTHER PUBLICATIONS

International Search Report and Written Opinion in PCT/US18/47029 dated Dec. 20, 2018.
V. Fang et al., "A review of near infrared reflectance properties of metal oxide nanostructures," GNS Science Report 2013/39, Jul. 2013, 25 pages.
Office Action in U.S. Appl. No. 16/105,004 dated Jul. 2, 2020.
Notice of Allowance in U.S. Appl. No. 16/105,004 dated Oct. 28, 2020.
Notice of Allowance in U.S. Appl. No. 17/160,690 dated Aug. 10, 2022.

(Continued)

*Primary Examiner* — Robert D Harlan
(74) *Attorney, Agent, or Firm* — Calfee, Halter & Griswold LLP

(57) ABSTRACT

Inorganic infrared attenuation agent blends have been developed to improve the thermal insulation properties of polymeric foams such as polystyrene low density foams. The inorganic infrared attenuation agent blends can include two or more metal oxides such as silicon dioxide, manganese (IV) oxide, iron (III) oxide, magnesium oxide, bismuth (III) oxide, cobalt oxide, zirconium (IV) oxide, molybdenum (III) oxide, titanium oxide, and calcium oxide. In some preferred embodiments, the inorganic infrared attenuation agent blends can include four or more of these metal oxides.

12 Claims, 5 Drawing Sheets

(56) References Cited

FOREIGN PATENT DOCUMENTS

| WO | 9634039 | A1 | 10/1996 |
| WO | 2001040362 | A1 | 6/2001 |
| WO | 2003102064 | A2 | 12/2003 |
| WO | 2004000926 | A2 | 12/2003 |
| WO | 2011094372 | A2 | 8/2011 |
| WO | 2016076997 | A1 | 5/2016 |
| WO | 2017016831 | A1 | 2/2017 |

OTHER PUBLICATIONS

Office Action in U.S. Appl. No. 17/978,586 dated Feb. 16, 2023.
Notice of Allowance in U.S. Appl. No. 17/978,586 dated May 22, 2023.
Extended European Search Report from EP Application No. 18846777.3 dated May 19, 2021.
Office Action from EP Application No. 18846777.3 dated Jul. 6, 2023.
Office Action from CN Application No. 201880053504.6 dated Jan. 17, 2022.
Office Action from CN Application No. 201880053504.6 dated Jun. 24, 2022.
Office Action from CN Application No. 201880053504.6 dated Nov. 1, 2022.
Office Action from JP Application No. 2020-509497 dated Jun. 22, 2022.
Office Action from JP Application No. 2020-509497 dated Jan. 10, 2023.
Office Action from KR Application No. 10-2020-7007203 dated Aug. 28, 2023.
Office Action from KR Application No. 10-2020-7007203 dated May 31, 2024.

* cited by examiner

INFRARED ATTENUATION AGENT BLENDS

RELATED APPLICATIONS

This application is a continuation of U.S. patent application Ser. No. 17/978,586, filed on Nov. 1, 2022, which is a divisional of U.S. patent application Ser. No. 17/160,690, filed on Jan. 28, 2021, now U.S. Pat. No. 11,499,026, which is a divisional of U.S. patent application Ser. No. 16/105,004, filed on Aug. 20, 2018, now U.S. Pat. No. 10,934,409, which claims priority to and any benefit of U.S. Provisional Patent Application No. 62/547,212, filed Aug. 18, 2017, the contents of which are incorporated herein by reference in their entireties.

FIELD OF THE DISCLOSURE

The present invention relates to foamed polymeric insulating materials containing blends of inorganic infrared attenuation agents. More particularly, it relates to foamed polymeric insulating materials containing blends of metal oxide infrared attenuation agents.

BACKGROUND

Polymeric foam is widely used as insulating material, and rigid foamed polymeric boards are frequently used in building and construction applications to provide insulation to walls, floors, ceilings, and other structural components. The purpose of insulating materials is to prevent or reduce the transfer of heat from an area of higher temperature to an area of lower temperature.

The overall heat transfer in a typical foamed polymeric board can be separated into three components: thermal conduction from gas (blowing agent) in the foam cells, thermal conduction from the polymer solids in the foam, and thermal radiation across the foamed polymeric board. Of these three heat transfer components, thermal radiation provides about 25% of the overall heat transfer. However, the transfer of heat through thermal radiation can be modified by the use of infrared attenuating agents.

An infrared attenuation agent ("IAA") can be used to protect and improve insulating materials, such as rigid foamed polymeric boards. An effective IAA increases absorption and re-emission of impinging heat, which decreases the transmission of heat radiation through the insulating polymer foam. Traditionally, flake-like inorganic materials have been used as IAAs, including, for example, graphite, aluminum, stainless steel, cobalt, nickel, carbon black, and titanium dioxide.

Unfortunately, individual inorganic IAAs may block only a narrow range of wavelengths in the IR spectrum. This means that IR radiation at wavelengths not blocked by the IAA is still transmitted across the insulating layer. There is therefore a need for IAAs that block a broader range of IR wavelengths and provide sufficient levels of thermal resistance for use in insulating polymer foams.

SUMMARY

In accordance with the present disclosure, it has been found that certain blends of metal oxides can serve as effective infrared attenuation agents (IAA). Accordingly, in one aspect, the current disclosure provides an insulating polymer foam that includes a foamed polymer comprising a) a polymer, b) a blowing agent, and c) an IAA blend comprising two or more metal oxides selected from the group consisting of silicon dioxide, manganese (IV) oxide, iron (III) oxide, magnesium oxide, bismuth (III) oxide, cobalt oxide, zirconium (IV) oxide, molybdenum (III) oxide, titanium oxide, and calcium oxide. In some embodiments, the IAA blend comprising two or more metal oxides selected from the group consisting of silicon dioxide, manganese (IV) oxide, iron (III) oxide, magnesium oxide, zirconium (IV) oxide, molybdenum (III) oxide, titanium oxide, and cobalt oxide. In some embodiments, the IAA blend comprises two or more metal oxides selected from the group consisting of silicon dioxide, manganese (IV) oxide, titanium oxide, iron (III) oxide, and magnesium oxide. In some embodiments, the IAA blend comprises four or more metal oxides selected from the group consisting of silicon dioxide, manganese (IV) oxide, iron (III) oxide, magnesium oxide, bismuth (III) oxide, cobalt oxide, zirconium (IV) oxide, molybdenum (III) oxide, titanium oxide, and calcium oxide.

In some embodiments, the IAA blend comprises at least 50% of the total amount of infrared attenuation agents added to the insulating polymer foam. In some embodiments, the IAA blend comprises, by weight: a) about 0% to about 10% of metal oxides that absorb infrared radiation greater than 1500 $cm^{-1}$; b) about 10% to about 30% of metal oxides that absorb infrared radiation from about 1500 $cm^{-1}$ to about 1200 $cm^{-1}$; c) about 20% to about 50% of metal oxides that absorb infrared radiation from about 1200 $cm^{-1}$ to about 800 $cm^{-1}$; d) about 10% to about 30% of metal oxides that absorb infrared radiation from about 800 $cm^{-1}$ to about 500 $cm^{-1}$; and e) about 0% to about 10% of metal oxides that absorb infrared radiation less than 500 $cm^{-1}$. In some embodiments, the IAA blend comprises from about 0.1 wt. % to 5 wt. % of the insulating polymer foam. In some embodiments, the IAA blend further comprises pea starch. In some embodiments, the polymer is an alkenyl aromatic polymer, such as polystyrene. In some embodiments, the insulating polymer foam has a cell size greater than 50 microns. In some embodiments, the insulating polymer foam has a cell size in the range of from 50 to 300 microns.

In some embodiments, the present disclosure provides a rigid foam insulating board made from a foamed polymer including an IAA blend comprising two or more metal oxides selected from the group consisting of silicon dioxide, manganese (IV) oxide, iron (III) oxide, magnesium oxide, bismuth (III) oxide, cobalt oxide, zirconium (IV) oxide, molybdenum (III) oxide, titanium oxide, and calcium oxide. In some embodiments, the board has a thickness of between about ⅛ inch to about 10 inches.

In another aspect, the present disclosure provides a method of preparing an insulating polymer foam having increased thermal resistance that includes the steps of: (a) providing a polymer; b) adding an IAA blend comprising two or more metal oxides selected from the group consisting of silicon dioxide, manganese (IV) oxide, iron (III) oxide, magnesium oxide, bismuth (III) oxide, cobalt oxide, zirconium (IV) oxide, molybdenum (III) oxide, titanium oxide, and calcium oxide to the polymer; c) melting the polymer to form a polymer melt; and d) extruding the polymer melt to form an insulating polymer foam. In some embodiments, the IAA blend comprises four or more metal oxides selected from the group consisting of silicon dioxide, manganese (IV) oxide, iron (III) oxide, magnesium oxide, bismuth (III) oxide, cobalt oxide, zirconium (IV) oxide, molybdenum (III) oxide, titanium oxide, and calcium oxide.

In some embodiments, the IAA blend comprises at least 50% of the total amount of infrared attenuation agents added to the insulating polymer foam. In some embodiments, the IAA blend comprises from about 0.1 wt. % to 3 wt. % of the insulating polymer foam. In some embodiments, the polymer is an alkenyl aromatic polymer, such as polystyrene.

In another aspect, the current disclosure provides a foamable polymer material comprising a) a polymer, b) a blowing agent, and c) an IAA blend comprising two or more metal oxides selected from the group consisting of silicon dioxide, manganese (IV) oxide, iron (III) oxide, magnesium oxide, bismuth (III) oxide, cobalt oxide, zirconium (IV) oxide, molybdenum (III) oxide, titanium oxide, and calcium oxide. In some embodiments, the IAA blend comprising two or more metal oxides selected from the group consisting of silicon dioxide, manganese (IV) oxide, iron (III) oxide, magnesium oxide, zirconium (IV) oxide, molybdenum (III) oxide, titanium oxide, and cobalt oxide. In some embodiments, the IAA blend comprises two or more metal oxides selected from the group consisting of silicon dioxide, manganese (IV) oxide, titanium oxide, iron (III) oxide, and magnesium oxide. In some embodiments, the IAA blend comprises four or more metal oxides selected from the group consisting of silicon dioxide, manganese (IV) oxide, iron (III) oxide, magnesium oxide, bismuth (III) oxide, cobalt oxide, zirconium (IV) oxide, molybdenum (III) oxide, titanium oxide, and calcium oxide. In some embodiments, the IAA blend comprises at least 50% of the total amount of infrared attenuation agents in the foamable polymer material. In some embodiments, the polymer is polystyrene.

BRIEF DESCRIPTION OF THE FIGURES

The present disclosure may be more readily understood by reference to the following figures, wherein.

DETAILED DESCRIPTION

Figure 1:
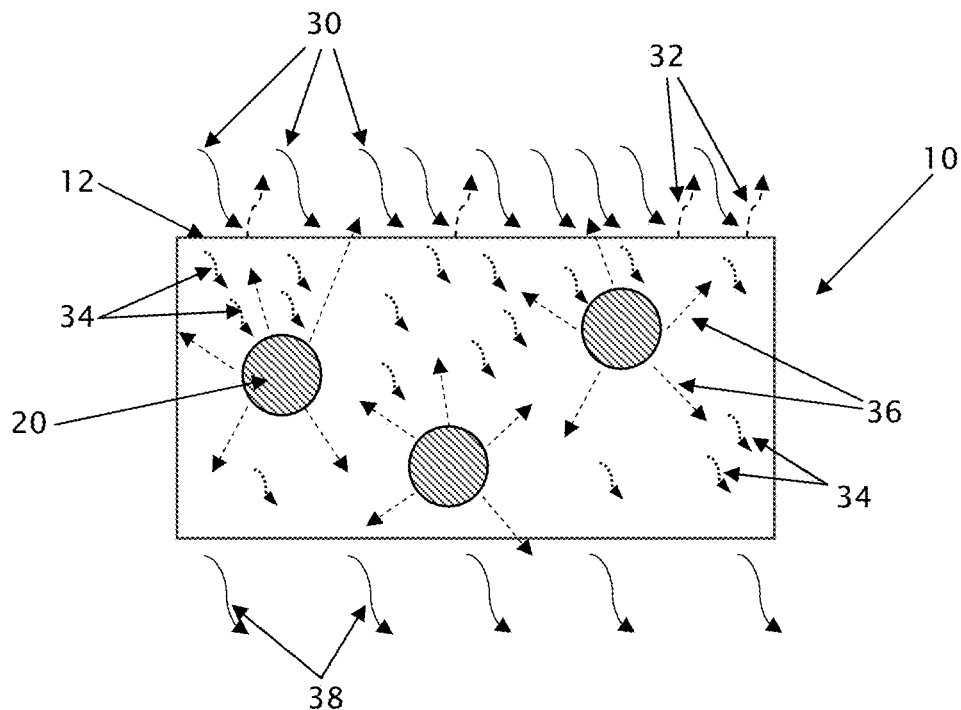
FIG. 1 provides an illustration of infrared radiation scattering by IAA particles.

The following discussion is presented to enable a person skilled in the art to make and use the present disclosure. Various modifications will be readily apparent to those skilled in the art, and the general principles disclosed herein may be applied to other embodiments and applications without departing from the scope of the present disclosure. Thus, the present disclosure is not intended to be limited to the embodiments shown, but is to be accorded the widest scope consistent with the principles and features disclosed herein.

Unless otherwise defined, all technical and scientific terms used herein have the same meaning as commonly understood by one of ordinary skill in the art to which this disclosure pertains. In case of conflict, the present specification, including definitions, will control.

The terminology as set forth herein is for description of the embodiments only and should not be construed as limiting. Unless otherwise specified, "a," "an," "the," and "at least one" are used interchangeably. Furthermore, as used in the Detailed Description and the appended claims, the singular forms "a", "an", and "the" are inclusive of their plural forms, unless contraindicated by the context surrounding such.

Also herein, the recitations of numerical ranges by endpoints include all numbers subsumed within that range (e.g., 1 to 5 includes 1, 1.5, 2, 2.75, 3, 3.80, 4, 5, etc.).

Insulating Polymer Foams

Thermal insulation reduces the transfer of heat between objects in thermal contact. Insulating polymer foams are popular thermal insulation materials, because of their desirable properties, including but not limited to ease of manufacture, moldability, light weight, and thermal insulating capacity.

Insulating polymer foams are mixtures of polymer and gas, where the polymer forms a solid matrix that may enclose the gas in tiny gas-filled cells (closed-cell foam) and/or surround tiny tunnels from which the gas escapes (open-cell foam). The gas in the polymer mixture may come from blowing agents, which are compositions that release gas upon certain conditions, such as pressure changes, temperature changes, chemical reactions, and so forth. When the polymer and the blowing agent are combined and treated under the appropriate conditions, the combination may create an insulating polymer foam. The insulating polymer foam may also include other components, such as processing aids, colorants, UV absorbers, antioxidants, fire retardants, infrared attenuation agents, and other such additives, as are required for the specific function to which the insulating polymer foam is intended.

Insulating polymer foams are used to provide thermal insulation in diverse applications, including but not limited to building insulation, food containers, hot or cold beverage cups, picnic coolers, shipping containers, etc.

Infrared Attenuation Agents

Thermal conductivity, k, is defined as the ratio of the heat flow per cross-sectional unit of insulating material to the temperature drop per unit thickness. In metric units, the formula to calculate k is:

$$k = \frac{W}{m \bullet °K.}$$

where W=watts of power, m=mass of insulating material, and ° K=temperature drop in degrees Kelvin. In Imperial units, the formula to calculate k is:

$$k = \frac{Btu \bullet in}{hr \bullet ft^2 \bullet °F.}$$

where Btu=heat in British Thermal Units, in=cross-sectional thickness of insulating material in inches, hr=hour, $ft^2$=surface area of insulating material in square feet, and ° F.=temperature drop in degrees Fahrenheit. The total thermal resistance R (i.e., R-value) is the measure of the resistance to heat transfer, calculated as:

$$R=t/k$$

where t=the thickness of the insulating material.

The overall heat transfer in a typical insulating polymer foam board can be separated into three components: thermal conduction from gas (blowing agent) in the foam cells, thermal conduction from the polymer solids in the foam, and thermal radiation across the foamed polymeric board. Gas convection within the cells is negligible due to the small cell sizes present in typical insulating polymeric foam. See Schutz and Glicksman, J. Cellular Plastics, March-April, 114-121 (1984). For polymeric foam materials, gas thermal conduction contributes about 60% of heat transfer and solid conduction contributes about 15% of heat transfer. When the materials for the blowing agent and the polymer matrix in the foamed polymeric board are selected, the contributions of the two thermal conduction components to heat transfer are essentially fixed and are difficult to modify. The remaining heat transfer component, thermal radiation, contributes about 25% of the overall heat transfer.

However, the transfer of heat through thermal radiation can be modified by the use of an infrared attenuating agent ("IAA"). The thermal conductivity, k, of a polymeric foam material can be reduced, and hence the insulating effect provided by the foam can be increased, by including a suitable amount of an IAA in the polymeric foam material. Typically, these IAA materials are small particulates, less than about 1 mm in size, made from various different materials including inorganic materials (e.g., aluminum oxide, clay particles), metals (e.g., aluminum, gold, silver) and carbon-based materials (e.g., carbon black, graphite, expanded graphite, fibers made from carbon or graphite), etc.

FIG. 1 illustrates how IAAs modify the transfer of heat through a polymeric foam material. The polymeric foam material 10 comprises particles of an IAA material 20. Heat impinging on the polymeric foam material 10 is in the form of infrared ("IR") radiation 30. When IR radiation 30 strikes the surface 12 of an object 10, a portion of the IR radiation 32 is reflected back into the environment and another portion 34 is absorbed by the object and transformed into heat. Some of the heat 34 absorbed by the object is re-emitted from the IAA particles 20 as IR radiation 36, a portion of which returns back to the environment through the surface 12 of the object 10. Some of the absorbed heat 34 and radiation 36 re-emitted from the IAA particles 20 eventually exits the other side of the object 10 as IR radiation 38. The IR radiation 38 emitted by an object 10 is thus reduced by the presence of the IAA particles 20. The IR radiation 38 emitted by an object 10 is a function of its temperature. The wavelength of its peak intensity follows Wien's law, where the product of peak value wavelength and absolute temperature are held constant. As the temperature range of interest for polymeric foams is typically around room temperature (i.e., 25° C.), this results in a peak intensity of IR radiation of about 1000 $cm^{-1}$, as seen in the IR spectrum illustrated in FIG. 2.

A common problem associated with insulating materials, such as rigid foamed polymeric boards, is that they absorb IR radiation if the boards are exposed to direct or reflected sunlight during building construction. The surface of each board that absorbs the IR radiation may heat, but the heat is distributed unevenly through the thickness of the board because of the board's insulating properties. This uneven heating may cause the rigid foamed polymeric boards to warp, distort, curl, or otherwise change dimensionally during the construction process. Such dimensional changes may compromise the fit of the insulating materials, which leads to gaps around the foam insulation and therefore reduced efficiency of the insulation within the completed building.

To effectively prevent this heating and uneven heat transference, an inorganic IAA may be added to the insulating polymeric foam. Without wishing to be bound by theory, IAA particles are believed primarily to absorb impinging IR radiation, but an IAA particle may also reflect or refract the IR radiation. A portion of the IR radiation absorbed by the IAA particle may convert to heat, which dissipates by conduction through the solid polymer matrix of the foam or the gaseous blowing agent in the foam cells. It is believed that the remaining portion of the IR radiation absorbed by the IAA particle is re-emitted as IR radiation into the area surrounding the IAA particle. The re-emitted IR radiation is spread uniformly in all directions around the IAA particle. This means that a substantial portion (possibly around half) of the re-emitted IR radiation is directed generally toward the original heat source and away from the bulk of the polymeric foam material. This effect reduces the overall heat absorption by the insulating polymer foam material, and slows the overall rate of heat transfer through the insulating polymer foam material, resulting in a lower macroscopic thermal conductivity.

Figure 2:
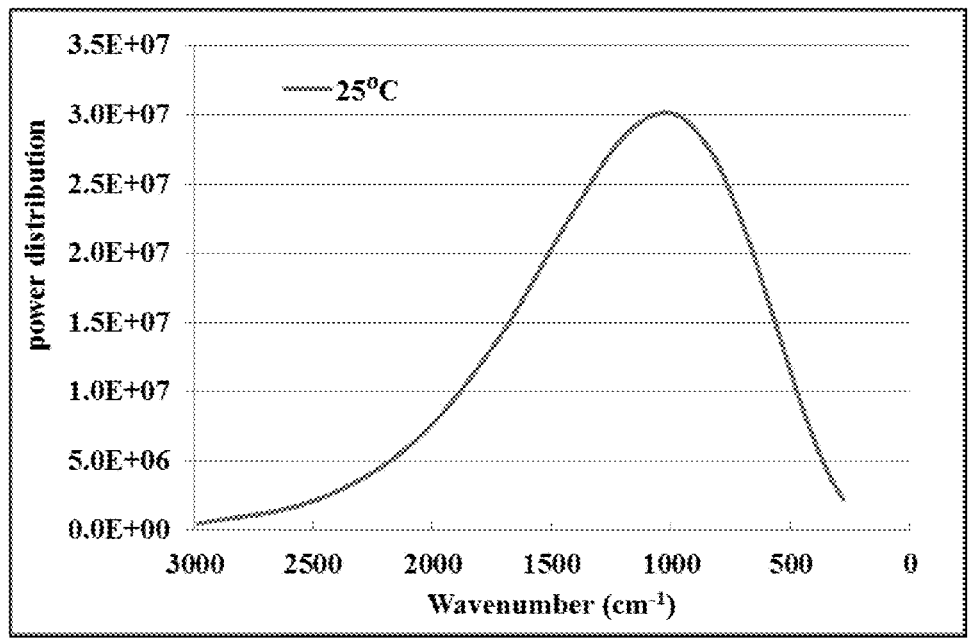
FIG. 2 graphically illustrates a spectrum showing the IR emission intensity of an exemplary object at 25° C.

Ideally, an IAA absorbs infrared radiation at all wavelengths of the infrared emission spectrum, such as the IR spectrum shown in FIG. 2. Unfortunately, individual inorganic IAAs typically block only a narrow range of wavelengths in the IR spectrum. This means that IR radiation at wavelengths not blocked by the IAA is still being absorbed and transmitted across the insulating layer. The problems from uneven heating of rigid foamed polymeric boards (warping, distortion, curling, dimensional changes) may not be fully alleviated by individual inorganic IAAs.

It has been discovered that these problems may be avoided by using certain blends of metal oxides as the IAAs in the polymeric foam insulation. Such metal oxide blends block a wide range of wavelengths in the IR spectrum. Metal oxide IAA blends also effect a substantial reduction in the thermal conductivity of the insulating polymer foam, provided that a proper blend and sufficient amount of metal oxide IAAs are selected.

Metal Oxide Infrared Attenuation Agents

In accordance with this disclosure, blends of inorganic compounds, more specifically blends of powdered inorganic metal oxides, have been found to achieve a significant IR attenuation effect, because these blends block a wide range of the IR spectrum and promote a substantial reduction in the thermal conductivities of insulating polymer foams in which they are included. In some embodiments, the metal oxide IAA blend comprises two or more metal oxides. In some embodiments, the metal oxide IAA blend comprises three or more metal oxides. In some embodiments, the metal oxide IAA blend comprises four or more metal oxides.

In some embodiments, the metal oxide IAA blend comprises at least 50% of the total IAA content in the insulating polymer foam. Other IAAs that may be used in the formulation of the insulating foam include, but are not limited to, graphite, aluminum, stainless steel, gold, silver, cobalt, nickel, carbon black, and aluminum oxide. In some embodiments, the metal oxide IAA blend comprises about 50%-100% of the total IAA content in the insulating polymer foam, including about 60%-100%, including about 60%-95%, including about 60%-90% including about 60%-85%, including about 60%-80%, including about 60%-75%, including about 60%-70%, including about 65%-100%, including about 65%-95%, including about 65%-90%, including about 65%-85%, including about 65%-80%, including about 65%-75%, including about 70%-100%, including about 70%-95%, including about 70%-90%, including about 70%-85%, including about 70%-80%, including about 70%-75%, including about 75%-100%, including about 75%-95%, including about 75%-90%, including about 75%-85%, including about 75%-80%, including about 80%-100%, including about 80%-95%, including about 80%-90%, including about 80%-85%, including about 85%-100%, including about 85%-95%, and including about 85%-90% of the total IAA content in the insulating polymer foam.

Figure 3A:
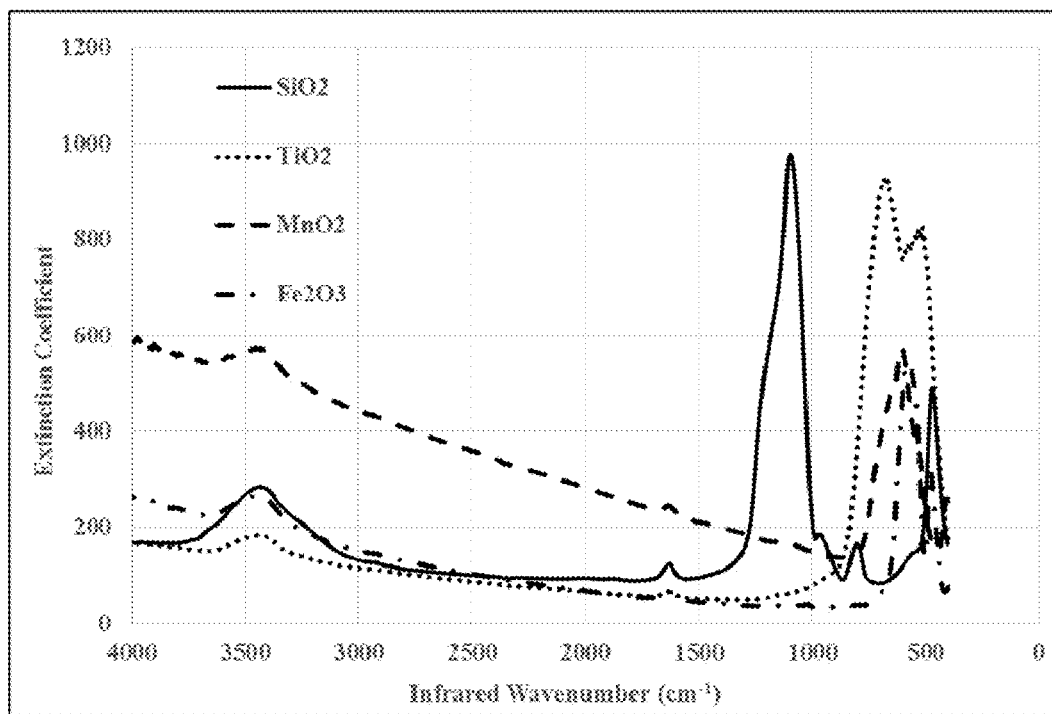
FIGS. 3A-3C graphically illustrate spectra showing the IR absorption bands for individual metal oxides.
Figure 3B:
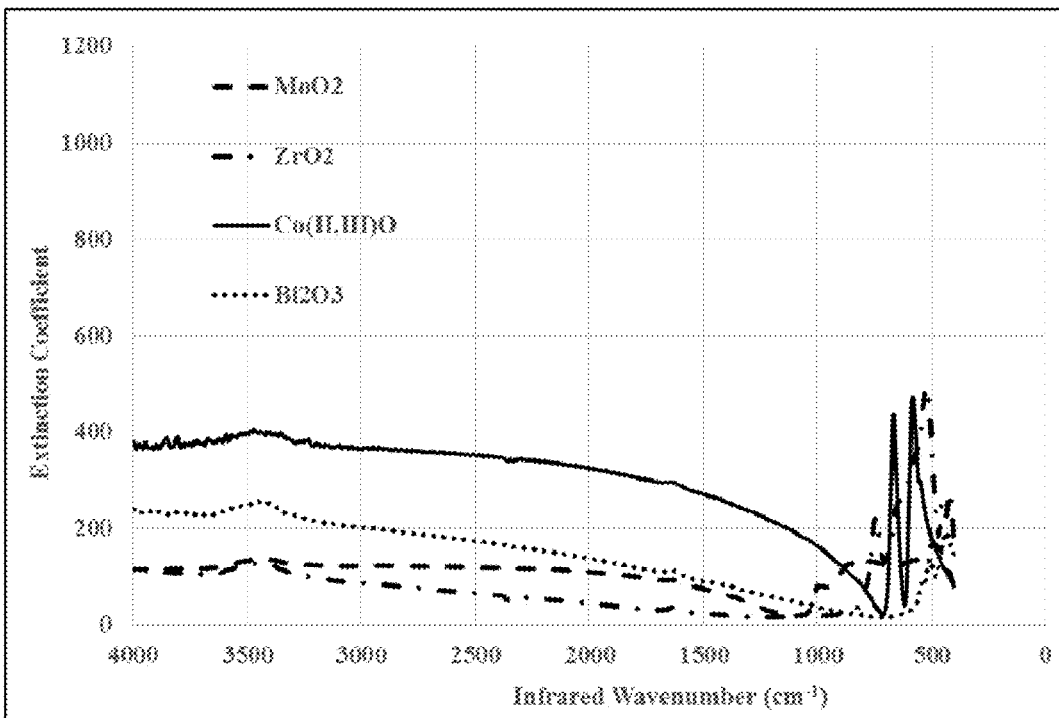
Figure 3C:
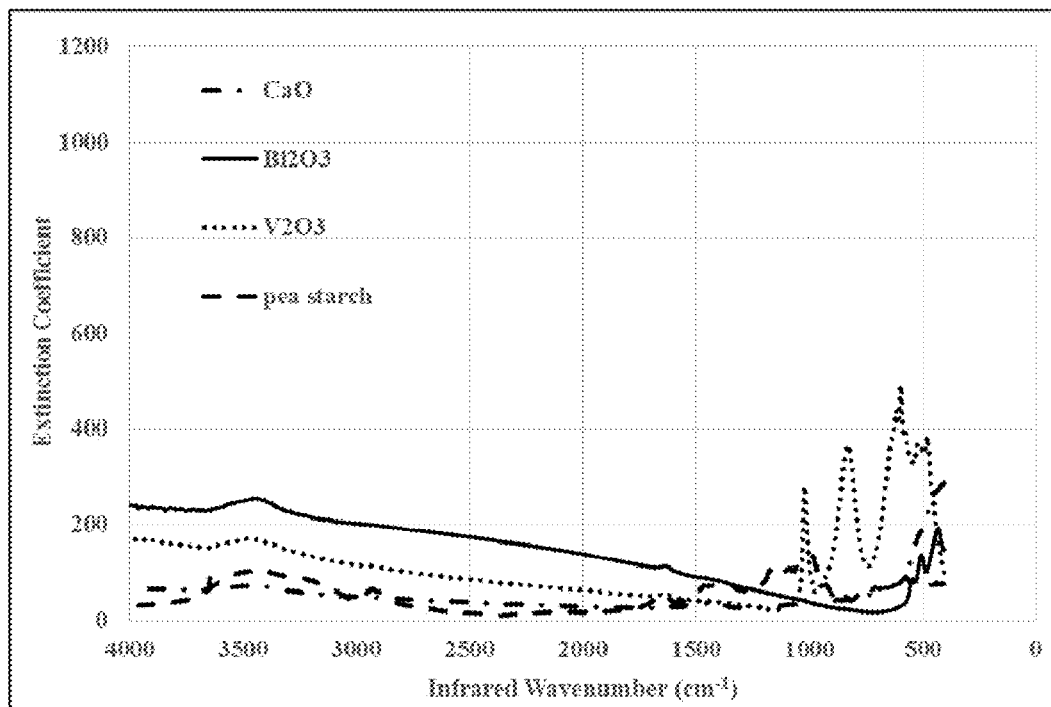

It has unexpectedly been discovered that certain blends of metal oxide IAAs can be selected to absorb a broader range of IR radiation than is possible with typical individual inorganic IAAs. FIGS. 3A-3C illustrate spectra showing the regions of IR radiation absorbed by individual metal oxides. It should be noted that, within a given absorption range for a given metal oxide, that metal oxide does not absorb the IR light evenly at every wavelength number; instead, within a given range, the absorption strength has peaks of great absorption and troughs of less absorption. However, by comparing the absorption spectra of various metal oxides, blends of the metal oxides can be selected where an absorbance peak of one metal oxide overlaps the trough of another metal oxide.

Moreover, it has further been discovered that improved blocking of IR radiation can be obtained by blending two or more metal oxides from the group consisting of silicon dioxide, manganese (IV) oxide, iron (III) oxide, magnesium oxide, bismuth (III) oxide, cobalt oxide, zirconium (IV) oxide, molybdenum (III) oxide, titanium oxide, and calcium oxide. An exemplary metal oxide IAA blend includes two or more metal oxides selected from the group consisting of silicon dioxide, manganese (IV) oxide, iron (III) oxide, magnesium oxide, zirconium (IV) oxide, molybdenum (III) oxide, titanium oxide, and cobalt oxide. Another exemplary metal oxide IAA blend includes two or more metal oxides selected from the group consisting of silicon dioxide, manganese (IV) oxide, titanium oxide, iron (III) oxide, and magnesium oxide. Yet another exemplary metal oxide blend includes four or more metal oxides from the group consisting of silicon dioxide, manganese (IV) oxide, iron (III) oxide, magnesium oxide, bismuth (III) oxide, cobalt oxide, zirconium (IV) oxide, molybdenum (III) oxide, titanium oxide, and calcium oxide. However, the precise combination of metal oxides in the metal oxide IAA blend may be adjusted in consideration of such factors as emission temperature of the insulating foam, relative absorption strength of the metal oxides, and availability and cost of the metal oxides.

As shown in FIG. 2, the IR emission spectrum of a heated object is not constant but rather shows a bell-shaped distribution, with a peak emission at around 1000 $cm^{-1}$. To select the right amounts of each metal oxide in the metal oxide IAA blend, it may be necessary to use a larger amount of the selected metal oxides that absorb around the IR wavelengths where emission is large and a lesser amount of the selected metal oxides that absorb around the IR wavelengths where the emission is small. Note that an individual metal oxide in the IAA blend may absorb IR emissions falling in two or more or more wavelength ranges. Table 1 presents exemplary weight percentage distributions of metal oxides that absorb at different wavelength regions for an object at about 25° C.

TABLE 1

| IR Wavelength range ($cm^{-1}$) | Exemplary range of metal oxides in IAA blend (wt. %) | Exemplary composition of metal oxide IAA blend (wt. %) |
| --- | --- | --- |
| >1500 | 0-10 | 10 |
| 1500-1200 | 10-30 | 20 |
| 1200-800 | 30-50 | 40 |
| 800-500 | 10-30 | 20 |
| <500 | 0-10 | 10 |

The metal oxide IAA blend may comprise metal oxides that are ground into a fine powder. This improves the homogeneous mixing of the metal oxide IAA blend into the polymer composition of the insulating foam. In some embodiments, the average particle size of the powdered metal oxide IAA blend may be from about 1 μm to about 100 μm, including from about 1 μm to about 50 μm, including from about 1 μm to about 25 μm, including from about 2 μm to about 50 μm, including from about 2 μm to about 25 μm, including from about 3 μm to about 50 μm, including from about 3 μm to about 25 μm, including from about 4 μm to about 50 μm, including from about 4 μm to about 25 μm, including from about 5 μm to about 50 μm, and including from about 5 μm to about 25 μm. In some embodiments, the average size of the powdered metal oxide IAA blend may be from about 50 nm to about 1 μm, including from about 50 nm to about 750 nm, including from about 50 nm to about 500 nm, including from about 50 nm to about 250 nm, including from about 50 nm to about 200 nm, including from about 50 nm to about 150 nm, including from about 50 nm to about 100 nm, including from about 50 nm to about 75 nm, including from about 60 nm to about 1 μm, including from about 60 nm to about 750 nm, including from about 60 nm to about 500 nm, including from about 60 nm to about 250 nm, including from about 60 nm to about 200 nm, including from about 60 nm to about 150 nm, including from about 60 nm to about 100 nm, including from about 75 nm to about 1 μm, including about 75 nm to about 750 nm, including from about 75 nm to about 500 nm, including from about 75 nm to about 250 nm, including from about 75 nm to about 200 nm, including from about 75 nm to about 150 nm, including from about 75 nm to about 100 nm, including from about 90 nm to about 1 μm, including from about 90 nm to about 750 nm, including from about 90 nm to about 500 nm, including from about 90 nm to about 250 nm, including from about 90 nm to about 200 nm, including from about 90 nm to about 150 nm, including from about 90 nm to about 100 nm, including from about 100 nm to about 1 μm, including from about 100 nm to about 750 nm, including from about 100 nm to about 500 nm, including from about 100 nm to about 250 nm, including from about 100 nm to about 200 nm, including from about 100 nm to about 150 nm, including from about 125 nm to about 1 μm, including from about 125 nm to about 750 nm, including from about 125 nm to about 500 nm, including from about 125 nm to about 250 nm, including from about 125 nm to about 200 nm, including from about 125 nm to about 150 nm, including from about 150 nm to about 1 μm, including from about 150 nm to about 750 nm, including from about 150 nm to about 500 nm, including from about 150 nm to about 250 nm, including from about 150 nm to about 200 nm, including from about 200 nm to about 1 μm, including from about 200 nm to about 750 nm, including from about 200 nm to about 500 nm, including from about 200 nm to about 250 nm, including from about 250 nm to about 1 μm, including from about 250 nm to about 750 nm, including from about 250 nm to about 500 nm.

The metal oxide IAA blend may be incorporated into the polymer composition of the insulating foam at a concentration from about 0.1 wt. % to about 5 wt. % by weight of the polymer, including from about 0.1 wt. % to about 3 wt. %, including from about 0.1 wt. % to about 2 wt. %, including from about 0.1 wt. % to about 1.5 wt. %, including from about 0.1 wt. % to about 1 wt. %, including from about 0.1 wt. % to about 0.9 wt. %, including from about 0.1 wt. % to about 0.8 wt. %, including from about 0.1% to about 0.7%, including from about 0.1 wt. % to about 0.6 wt. %, including from about 0.1 wt. % to about 0.5 wt. %, including from about 0.1 wt. % to about 0.4 wt. %, including from about 0.2 wt. % to about 5 wt. %, including from about 0.2 wt. % to about 3 wt. %, including from about 0.2 wt. % to about 2 wt. %, including from about 0.2 wt. % to about 1.5 wt. %, including from about 0.2 wt. % to about 1 wt. %, including from about 0.2 wt. % to about 0.9 wt. %, including from about 0.2 wt. % to about 0.8 wt. %, including from about 0.2% to about 0.7%, including from about 0.2 wt. % to about 0.6 wt. %, including from about 0.2 wt. % to about 0.5 wt. %, including from about 0.2 wt. % to about 0.4 wt. %, including from about 0.3 wt. % to about 5 wt. %, including from about 0.3 wt. % to about 3 wt. %, including from about 0.3 wt. % to about 2 wt. %, including from about 0.3 wt. % to about 1.5 wt. %, including from about 0.3 wt. % to about 1 wt. %, including from about 0.3 wt. % to about 0.9 wt. %, including from about 0.3 wt. % to about 0.8 wt. %, including from about 0.3% to about 0.7%, including from about 0.3 wt. % to about 0.6 wt. %, including from about 0.3 wt. % to about 0.5 wt. %, including from about 0.3 wt. % to about 0.4 wt. %, including from about 0.4 wt. % to about 5 wt. %, including from about 0.4 wt. % to about 3 wt. %, including from about 0.4 wt. % to about 2 wt. %, including from about 0.4 wt. % to about 1.5 wt. %, including from about 0.4 wt. % to about 1 wt. %, including from about 0.4 wt. % to about 0.9 wt. %, including from about 0.4 wt. % to about 0.8 wt. %, including from about 0.4% to about 0.7%, including from about 0.4 wt. % to about 0.6 wt. %, including from about 0.4 wt. % to about 0.5 wt. %, including from about 0.5 wt. % to about 5 wt. %, including from about 0.5 wt. % to about 3 wt. %, including from about 0.5 wt. % to about 2 wt. %, including from about 0.5 wt. % to about 1.5 wt. %, including from about 0.5 wt. % to about 1 wt. %, including from about 0.5 wt. % to about 0.9 wt. %, including from about 0.5 wt. % to about 0.8 wt. %, including from about 0.5% to about 0.7%, including from about 0.5 wt. % to about 0.6 wt. %, including from about 0.6 wt. % to about 5 wt. %, including from about 0.6 wt. % to about 3 wt. %, including from about 0.6 wt. % to about 2 wt. %, including from about 0.6 wt. % to about 1.5 wt. %, including from about 0.6 wt. % to about 1 wt. %, including from about 0.6 wt. % to about 0.9 wt. %, including from about 0.6 wt. % to about 0.8 wt. %, including from about 0.6 wt. % to about 0.7 wt. %, and including from about 0.7 wt. % to about 5 wt. %, including from about 0.7 wt. % to about 3 wt. %, including from about 0.7 wt. % to about 2 wt. %, including from about 0.7 wt. % to about 1.5 wt. %, including from about 0.7 wt. % to about 1 wt. %, including from about 0.7 wt. % to about 0.9 wt. %, including from about 0.7 wt. % to about 0.8 wt. %, including from about 0.8 wt. % to about 5 wt. %, including from about 0.8 wt. % to about 3 wt. %, including from about 0.8 wt. % to about 1 wt. %, including from about 0.9 wt. % to about 5 wt. %, including from about 0.9 wt. % to about 3 wt. %, including from about 0.9 wt. % to about 1 wt. %, including from about 1 wt. % to about 5 wt. %, and including from about 1 wt. % to about 3 wt. %.

In certain embodiments, the insulating polymer foam may further comprise suitable organic compounds, such as polysaccharides, which absorb IR radiation around 1000 cm$^{-1}$. Suitable polysaccharides include cellulose and starch. A specific example of a suitable polysaccharide is pea starch, which contains ~35% amylose and ~65% amylopectin having the following structures:

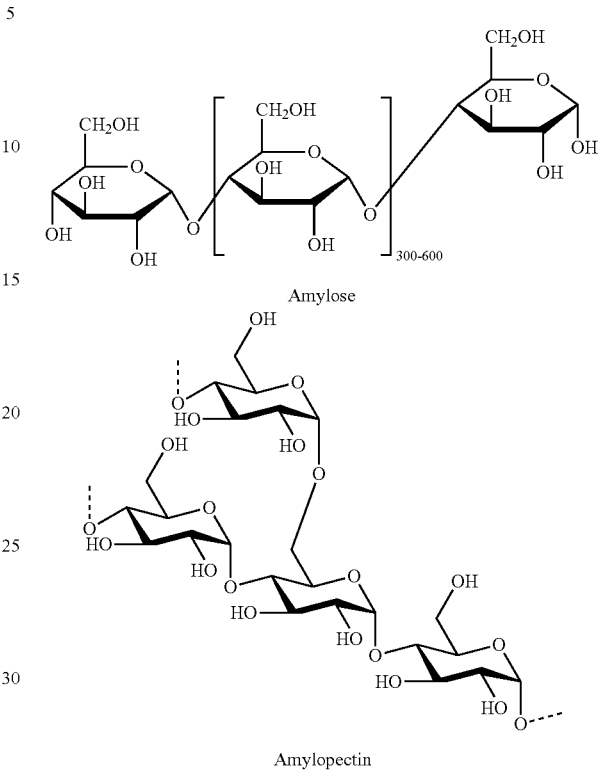

Amylose

Amylopectin

Polymers Forming the Foams

Insulating polymer foams using the metal oxide IAA blends of this disclosure can be made from any polymer suitable for making insulating polymer foams. For example, they may be made from polyolefins, polyvinylchloride, polycarbonates, polyetherimides, polyamides, polyesters, polyvinylidene chloride, polymethylmethacrylate, polyurethanes, polyurea, phenol-formaldehyde, polyisocyanurates, phenolics, copolymers and terpolymers of the foregoing, thermoplastic polymer blends, rubber modified polymers, and the like. Suitable polyolefins include polyethylene and polypropylene, and ethylene copolymers.

A particularly suitable class of thermoplastic polymers for making the insulating polymer foams of this disclosure is alkenyl aromatic polymers. Examples of alkenyl aromatic polymers include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer.

Suitable alkenyl aromatic polymers include those derived from alkenyl aromatic compounds such as styrene, α-methylstyrene, ethylstyrene, vinyl benzene, vinyl toluene, chlorostyrene, and bromostyrene. A particularly suitable alkenyl aromatic polymer is polystyrene. A minor amount of monoethylenically unsaturated compounds such as $C_{2-6}$ alkyl acids and esters, ionomeric derivatives, and $C_{4-6}$ dienes may be copolymerized with alkenyl aromatic compounds. Examples of copolymerizable compounds include acrylic acid, methacrylic acid, maleic acid, itaconic acid, acrylonitrile, maleic anhydride, methyl acrylate, ethyl acrylate, isobutyl acrylate, n-butyl acrylate, methyl methacrylate, vinyl acetate, and butadiene. A particularly suitable alkenyl aromatic polymer comprises substantially (i.e., greater than about 95 percent) polystyrene, which polystyrene homopolymer being particularly preferred.

The polymers used to make the inventive foams may have a weight-average molecular weights of about 30,000 to about 500,000. Weight average molecular weights on the order of about 100,000 to 400,000 or even about 120,000 to 300,000, are more interesting.

Combining the Metal Oxide IAA Blend with the Polymer

The metal oxide IAA blends can be combined with the polymer forming the inventive insulating polymer foams in any conventional manner. An amount from about 0.1% to about 5% by weight of metal oxide IAA blend can be included in the polymer.

In one approach, an in situ polymerization is used in which the monomers forming the polymer are polymerized after first being combined with the metal oxide IAA blends of this disclosure. This approach is especially effective when the polymer forming the foam is made by addition polymerization of ethylenically unsaturated monomers, especially polymers and copolymers of styrene, methyl methacrylate, or a mixture of these and/or other ethylenically unsaturated monomers. In some exemplary embodiments, styrene monomer and an initiator (catalyst), such as benzoyl peroxide (BPO), or 2,2'-azo-bis-isobutyronitrile (AIBN), are blended together completely using a conventional mixing apparatus such as a homogenizer. The metal oxide IAA blend is then added to the monomer-initiator mixture in an amount from about 0.1% to about 5% by weight based on the weight of the polymer. After mixing, the mixture is heated in an oven at a temperature of about 60 to 100° C., for about 15 to 30 hours for in-situ polymerization.

In mixing the metal oxide IAA blend with the monomer, as discussed above, it is important to have uniform distribution of the metal oxide IAA blend. For example, the metal oxides comprising the IAA blend may be added individually to the monomer, which is mixed thoroughly after each addition. Alternatively, uniform distribution may be achieved by vigorous mixing of the metal oxide IAA blend when it is added to the monomer before polymerization commences. Alternatively, the metal oxide IAA blend may be pre-blended with a polymeric carrier, such as polystyrene, polymethyl methacrylate (PMMA), ethylene methacrylate copolymer (EMA), to form an IAA masterbatch. The loading of the metal oxide IAA blend in can be as high as 70% by weight, including from 5% to 60%, including from 10% to 50%, and including from 20% to 40% by weight, in such an IAA masterbatch. The IAA masterbatch may then be added to the monomer and mixed thoroughly before polymerization commences.

Another approach for combining the metal oxide IAA blends of this disclosure with the polymer forming the inventive insulating polymer foams is physical blending in a melt-compounding process. This approach is especially useful when these polymers have a relatively low melting or softening point. For example, the individual metal oxides comprising the IAA blend may be added individually to the softened or molten polymer used in the insulating foam, which is mixed thoroughly after each addition. Alternatively, the metal oxide IAA blend may be blended directly into the softened or molten polymer used in the insulating foam, followed by thorough mixing. Alternatively, the metal oxide IAA blend may be pre-blended with a polymeric carrier, such as polystyrene, polymethyl methacrylate (PMMA), ethylene methacrylate copolymer (EMA), to form an IAA masterbatch. The loading of the metal oxide IAA blend can be as high as 70% by weight, including from 5% to 60%, including from 10% to 50%, and including from 20% to 40% by weight, in such an IAA masterbatch. The IAA masterbatch is then blended with the softened or molten polymer used in the insulating foam, and the masterbatch and polymer are mixed thoroughly. Mixing may be conducted by any standard method know in the art. In some embodiments, the components are mixed using a single screw or twin screw extruder.

In either approach, additional conventional additives such as plasticizers, flame retardant chemicals, pigments, elastomers, extrusion aids, antioxidants, fillers, antistatic agents, UV absorbers, citric acids, nucleating agents, surfactants, processing aids, etc., can be added in conventional amounts to the polymer used in the insulating foam.

Forming the Insulating Polymer Foam

After in-situ polymerization or melt compounding, the polymer containing the metal oxide IAA blend is foamed using a batch foaming process or standard extrusion process. For example, extruded polystyrene foams can be made by continuously extruding molten polystyrene containing a blowing agent under elevated temperature and pressure into ambient or vacuum conditions, allowing the mass to expand into lightweight, closed-cell foam. Standard extrusion processes and methods which may be used in the process of manufacturing embodiments of the present disclosure are described in commonly assigned U.S. Pat. No. 5,753,161 which is herein incorporated by reference in its entirety.

Alternatively, the metal oxide IAA blend (as powdered individual components, the powdered blend, or an IAA masterbatch) may be added to the extruder separately from the polymer used in the insulating foam. The metal oxide IAA blend may be added to the extruder with the polymer in the same feeder port, or the metal oxide IAA blend may be added into the extruder in a separate feeder port.

In the extrusion process, extruded insulating polymer foam containing the metal oxide IAA blend may be prepared by single-screw, twin-screw, or tandem extruders with flat die and plate shaper or radial die and slinky shaper. The polymer (with or without the metal oxide IAA blend), the metal oxide IAA blend (if not previously incorporated with the polymer), a blowing agent and, optionally, other additives are added to the extruder to form a polymeric resin mixture.

The polymeric resin mixture, containing the organic IAA, polymer, and optionally, other additives is heated to the melt mixing temperature and thoroughly mixed. The melt mixing temperature must be sufficient to soften or melt the polymer. Therefore, the melt mixing temperature is at or above the glass transition temperature or melting point of the polymer. In some embodiments, the melt mix temperature is from about 160° C. to about 250° C., including from about 170° C. to about 220° C.

A blowing agent is then incorporated to form a foamable gel. The foamable gel is then cooled to a die melt temperature. The die melt temperature is typically cooler than the melt mix temperature, preferably from about 100° C. to about 140° C., and most preferably from about 110° C. to about 130° C. The die pressure must be sufficient to prevent pre-foaming of the foamable gel containing the blowing agent. Pre-foaming is the undesirable premature foaming of the foamable gel before extrusion of the foamable gel into a region of reduced pressure. Accordingly, the die pressure varies depending upon the identity and amount of blowing agent in the foamable gel. Preferably, the pressure is from about 50 bars to about 80 bars, more preferably about 60 bars. The expansion ratio (i.e., foam thickness per die gap width) is in the range of about 20 to about 70, typically about 60.

Any suitable blowing agent may be used in the practice on this disclosure. Blowing agents useful in the practice of this disclosure include inorganic agents, organic blowing agents, chemical blowing agents, and combinations thereof.

Exemplary aspects of the subject invention may utilize one or more of a variety of blowing agents to achieve the desired polymeric foam properties in the final product. According to one aspect of the present invention, the blowing agent composition comprises one or more of: $CO_2$; halogenated blowing agents, such as hydrofluorocarbons (HFCs), hydrochlorofluorocarbons, hydrofluoroethers, hydrofluoroolefins (HFOs), hydrochlorofluoroolefins (HCFOs), hydrobromofluoroolefins, hydrofluoroketones, hydrochloroolefins, and fluoroiodocarbons; alkyl esters, such as methyl formate; ethanol; water; and mixtures thereof. In other exemplary embodiments, the blowing agent comprises one or more of $CO_2$, ethanol, HFOs, HCFOs, HFCs, and mixtures thereof.

The hydrofluoroolefin blowing agents may include, for example, 3,3,3-trifluoropropene (HFO-1243zf); 2,3,3-trifluoropropene; (cis and/or trans)-1,3,3,3-tetrafluoropropene (HFO-1234ze), particularly the trans isomer; 1,1,3,3-tetrafluoropropene; 2,3,3,3-tetrafluoropropene (HFO-1234yf); (cis and/or trans)-1,2,3,3,3-pentafluoropropene (HFO-1225ye); 1,1,3,3,3-pentafluoropropene (HFO-1225zc); 1,1,2,3,3-pentafluoropropene (HFO-1225yc); hexafluoropropene (HFO-1216); 2-fluoropropene, 1-fluoropropene; 1,1-difluoropropene; 3,3-difluoropropene; 4,4,4-trifluoro-1-butene; 2,4,4,4-tetrafluorobutene-1; 3,4,4,4-tetrafluoro-1-butene; octafluoro-2-pentene (HFO-1438); 1,1,3,3,3-pentafluoro-2-methyl-l-propene; octafluoro-1-butene; 2,3,3,4,4,4-hexafluoro-1-butene; 1,1,1,4,4,4-hexafluoro-2-butene (HFO-1336mzz) or (HFO-1336mzz-Z); 1,2-difluoroethene (HFO-1132); 1,1,1,2,4,4,4-heptafluoro-2-butene; 3-fluoropropene, 2,3-difluoropropene; 1,1,3-trifluoropropene; 1,3,3-trifluoropropene; 1,1,2-trifluoropropene; 1-fluorobutene; 2-fluorobutene; 2-fluoro-2-butene; 1,1-difluoro-I-butene; 3,3-difluoro-I-butene; 3,4,4-trifluoro-I-butene; 2,3,3-trifluoro-1-butene; 1,1,3,3-tetrafluoro-I-butene; 1,4,4,4-tetrafluoro-1-butene; 3,3,4,4-tetrafluoro-1-butene; 4,4-difluoro-1-butene; I,I,l-trifluoro-2-butene; 2,4,4,4-tetrafluoro-1-butene; 1,1,1,2-tetrafluoro-2 butene; 1,1,4,4,4-pentafluorol-butene; 2,3,3,4,4-pentafluoro-1-butene; 1,2,3,3,4,4,4-heptafluoro-1-butene; 1,1,2,3,4,4,4-heptafluoro-1-butene; and 1,3,3,3-tetrafluoro-2-(trifluoromethyl)-propene.

In some exemplary embodiments, the blowing agent comprises $CO_2$ and at least one HFO with a global warming potential (GWP) less than or equal to 25. In some exemplary embodiments, the blowing agent blends include trans-HFO-1234ze.

The blowing agent may also include one or more hydrochlorofluoroolefins (HCFO), such as HCFO-1233; l-chloro-1,2,2,2-tetrafluoroethane (HCFC-124); 1,1-dichloro-l-fluoroethane (HCFC-141b); 1,1,1,2-tetrafluoroethane (HFC-134a); 1,1,2,2-tetrafluoroethane (HFC-134); 1-chloro 1,1-difluoroethane (HCFC-142b); 1,1,1,3,3-pentafluorobutane (HFC-365mfc); 1,1,1,2,3,3,3-heptafluoropropane (HFC-227ea); tnchlorofluoromethane (CFC-11); dichlorodifluoromethane (CFC-12); and dichlorofluoromethane (HCFC-22).

The term "HCFO-1233" is used herein to refer to all trifluoromonochloropropenes. Among the trifluoromonochloropropenes are included both cis- and trans-3-chloro-1,1,1-trifluoro-propene (HCFO-1233zd or 1233zd). The term "HCFO-1233zd" or "1233zd" is used herein generically to refer to 1,1,1-trifluoro-3-chloropropene, independent of whether it is the cis- or trans-form. The terms "cis HCFO-1233zd" and "trans HCFO-1233zd" are used herein to describe the cis- and trans-forms or trans-isomer of 1,1,1-trifluoro-3-chloropropene, respectively. The term "HCFO-1233zd" therefore includes within its scope cis HCFO-1233zd (also referred to as 1233zd(Z)), trans HCFO-1233zd (also referred to as 1233(E)), and all combinations and mixtures of these.

In some exemplary embodiments, the blowing agent may comprise one or more hydrofluorocarbons. The specific hydrofluorocarbon utilized is not particularly limited. A non-exhaustive list of examples of suitable blowing HFC blowing agents include 1,1-difluoroethane (HFC-152a), 1,1,1,2-tetrafluoroethane (HFC-134a), 1,1,2,2-tetrafluoroethane (HFC-134), 1,1,1-trifluoroethane (HFC-143a), difluoromethane (HFC-32), 1,3,3,3-pentafluoropropane (HFO-1234ze), pentafluoro-ethane (HFC-125), fluoroethane (HFC-161), 1,1,2,2,3,3-hexafluoropropane (HFC 236ca), 1,1,1,2,3,3-hexafluoropropane (HFC-236ea), 1,1,1,3,3,3-hexafluoropropane (HFC-236fa), 1,1,1,2,2,3-hexafluoropropane (HFC-245ca), 1,1,2,3,3-pentafluoropropane (HFC-245ea), 1,1,1,2,3 pentafluoropropane (HFC-245eb), 1,1,1,3,3-pentafluoropropane (HFC-245fa), 1,1,1,4,4,4-hexafluorobutane (HFC-356mff), 1,1,1,3,3-pentafluorobutane (HFC-365mfc), and combinations thereof.

Insulating Polymer Foams

The insulating polymer foams are rigid, closed cell foams exhibiting a density of about 1.0 to about 5 pcf, more typically about 1.4 to about 3 pcf, and a thermal conductivity of about 0.1 to about 0.3 BTU·in/(hr·ft$^2$·° F.), 0.14 to about 0.25 BTU·in/(hr·ft$^2$·° F.), or about 0.2 to BTU·in/(hr·ft$^2$·° F.). Insulating polymer foams including the metal oxide IAA blends of the present disclosure preferably provide about 0.5~2% lower conductivity compared with insulating polymer foams lacking an IAA. The insulating polymer foam can have a cell size ranging from 50 to 500 microns. In some embodiments, the insulating polymer foam has an average cell size ranging from 50 to 400 microns, or from 100 to 300 microns, or from 100 to 250 microns. Insulating polymer foams having an average cell size greater than about 150 microns are particularly suitable. The insulating polymer foam can be formed into a variety of shapes, such as an insulating polymer foam board. Insulating polymer foam board can be about ⅛ to 12 inches thick, but is more typically about ½ to 4 inches thick.

In certain embodiments, the insulating polymer foam may have an R value in the range of 3 to 8° F.·ft²·hr/BTU. In other embodiments, the insulating polymer foam may have an R value in the range of 4 to 6° F.·ft²·hr/BTU. In certain embodiments, the insulating polymer foam may be comprised of less than 50% by weight of a conventional inorganic IAA, wherein the conventional inorganic IAA is selected from the group consisting of graphite, aluminum, stainless steel, cobalt, nickel, carbon black, titanium dioxide, and combinations thereof. Furthermore, in certain embodiments, the insulating polymer foam having an R value in the range of 3 to 8° F.·ft²·hr/BTU and comprised of a metal oxide IAA blend may be substantially free of a conventional inorganic IAA.

EXAMPLES

In order to more thoroughly describe embodiments of this disclosure, the following working examples are provided.

The following examples are provided for illustrative purposes only and are in no way intended to limit the scope of the disclosure.

Example 1: Polystyrene Foam Containing Metal Oxide IAAs with Different Infrared Absorption Wavelengths Polystyrene foam samples containing three metal oxide IAA blends were prepared. The composition of each metal oxide IAA blend is given in Table 2.

TABLE 2

| Components | Blend MO#1 (wt. %) | Blend MO#2 (wt. %) | Blend MO#3 (wt. %) |
|---|---|---|---|
| Zirconium(IV) Oxide | 80 | 20 | 4 |
| Titanium(IV) Oxide | 20 | 80 | 10 |
| Magnesium Oxide | | | 40 |
| Silicon Dioxide | | | 20 |
| Iron(III) Oxide | | | 20 |
| Manganese(IV) Oxide | | | 3 |
| Calcium Oxide | | | 3 |

Three levels (0.2, 0.4, and 0.8 wt. %) of each metal oxide IAA blend were melt blended into polystyrene in a twin screw extruder. As a control, polystyrene without an IAA was also prepared. Carbon dioxide/ethanol was incorporated as the blowing agent and talc as the nucleating agent into the molten polystyrene mixture in the extruder. The compositions and certain properties for the sample foams are included in Table 3.

TABLE 3

| Composition # | Talc MB (wt. %) | Blend MO#3 (wt. %) | Blend MO#1 (wt. %) | Blend MO#2 (wt. %) | $CO_2$ (wt. %) | Ethanol (wt. %) | Density (pcf) | cell size (mm) | Open Cell % | Compressive strength (psi) |
|---|---|---|---|---|---|---|---|---|---|---|
| Control 1 | 2 | | | | 3.65 | 1.4 | 1.71 | 0.18 | 1.93 | 35.2 |
| Example 1 | 2 | 0.2 | | | 3.65 | 1.4 | 1.73 | 0.19 | 0.96 | 34.5 |
| Example 2 | 2 | 0.4 | | | 3.65 | 1.4 | 1.73 | 0.18 | 1.76 | 32.7 |
| Example 3 | 2 | 0.8 | | | 3.65 | 1.4 | 1.72 | 0.18 | 1.48 | 29.7 |
| Control 2 | 0.78 | | | | 3.3 | 2.25 | 1.81 | 0.23 | 3.64 | 31.5 |
| Example 4 | 0.78 | | 0.2 | | 3.3 | 2.25 | 1.79 | 0.23 | 2.57 | 31.0 |
| Example 5 | 0.78 | | 0.4 | | 3.3 | 2.25 | 1.80 | 0.23 | 2.70 | 31.0 |
| Example 6 | 0.78 | | 0.8 | | 3.3 | 2.25 | 1.80 | 0.24 | 2.25 | 30.5 |
| Example 7 | 0.78 | | | 0.2 | 3.3 | 2.25 | 1.78 | 0.24 | 2.87 | 31.2 |
| Example 8 | 0.78 | | | 0.4 | 3.3 | 2.25 | 1.77 | 0.24 | 3.52 | 30.4 |
| Example 9 | 0.78 | | | 0.8 | 3.3 | 2.25 | 1.78 | 0.24 | 2.88 | 30.6 |

Figure 4:
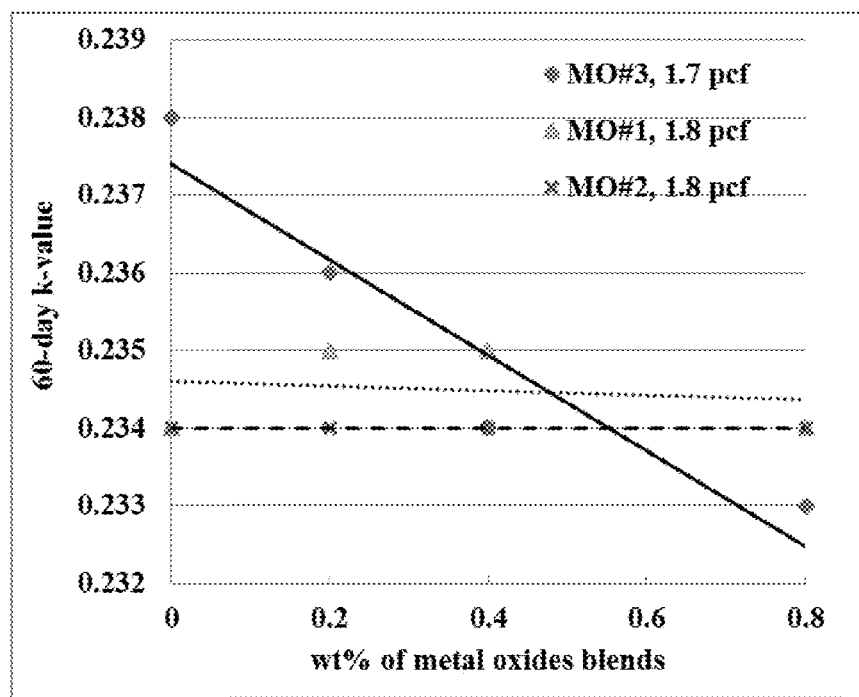
FIG. 4 graphically illustrates the thermal conductivity of exemplary XPS foams including various inorganic IAAs.

Thermal conductivity as the foam samples aged was then recorded up to 60 days. The 60-day thermal conductivities at each concentration of the metal oxides blends in the samples are shown in FIG. 4. As can be seen, not all metal oxides blends can reduce thermal conductivity. Blends MO #1 and MO #2 contain titanium oxide and zirconium oxide, and their infrared absorption bands overlap in the range of 400 to 900 $cm^{-1}$, as shown in FIG. 3. Foam thermal conductivity shows little or no reduction with these two metal oxides blends. In comparison, blend MO #3 contains more metal oxides, and these oxides cover a broader infrared wavelength range (400–4000 $cm^{-1}$). As a result, foam thermal conductivity decreases consistently with increasing concentration of the metal oxide blend MO #3.

Example 2: Polystyrene Foam Containing Metal Oxide IAAs with Different Infrared Absorption Intensity Polystyrene foam samples containing two blends of metal oxide IAAs were prepared using the methods described for Example 1. Blend MO #6 also included pea starch, a polysaccharide, to evaluate the effect of blending metal oxide IAAs with an organic IAA. The composition of each IAA blend is given in Table 4.

TABLE 4

| Components | Blend MO#6 (wt. %) | Blend MO#8 (wt. %) |
| --- | --- | --- |
| Pea Starch | 20 | |
| Silicon Dioxide | 20 | 20 |
| Zirconium(IV) Oxide | 15 | 20 |
| Aluminum Oxide | 15 | 20 |
| Magnesium Oxide | 15 | 20 |
| Iron(III) Oxide | 15 | 20 |

By following similar formulation and processing conditions as described in example 1, the two blends MO #6 and MO #8 were added to XPS foam at four levels (0.2, 0.4, 0.8, and 1.6 wt. %). The compositions and certain properties for the sample foams are included in Table 5.

TABLE 5

| Composition # | Talc MB (wt. %) | Blend MO#6 (wt. %) | Blend MO#8 (wt. %) | $CO_2$ (wt. %) | Ethanol (wt. %) | Density (pcf) | cell size (mm) | cell x:z | Open Cell % | Compressive Strength (psi) |
| --- | --- | --- | --- | --- | --- | --- | --- | --- | --- | --- |
| Control 3 | 2 | | | 3.65 | 1.4 | 1.78 | 0.18 | 0.75 | 0.97 | 42.13 |
| Example 10 | 2 | 0.2 | | 3.65 | 1.4 | 1.79 | 0.17 | 0.79 | 0.82 | 43.32 |
| Example 11 | 2 | 0.4 | | 3.65 | 1.4 | 1.8 | 0.18 | 0.79 | 1.33 | 43.1 |
| Example 12 | 2 | 0.8 | | 3.65 | 1.4 | 1.78 | 0.17 | 0.79 | 1.02 | 42.82 |
| Example 13 | 2 | 1.6 | | 3.65 | 1.4 | 1.81 | 0.17 | 0.74 | 0.36 | 42.85 |
| Example 14 | 2 | | 0.2 | 3.65 | 1.4 | 1.77 | 0.18 | 0.84 | 1.39 | 39.62 |
| Example 15 | 2 | | 0.4 | 3.65 | 1.4 | 1.77 | 0.18 | 0.84 | 2.12 | 38.28 |
| Example 16 | 2 | | 0.8 | 3.65 | 1.4 | 1.78 | 0.17 | 0.79 | 1.26 | 39.33 |
| Example 17 | 2 | | 1.6 | 3.65 | 1.4 | 1.78 | 0.17 | 0.78 | 1.14 | 40.43 |

Figure 5:
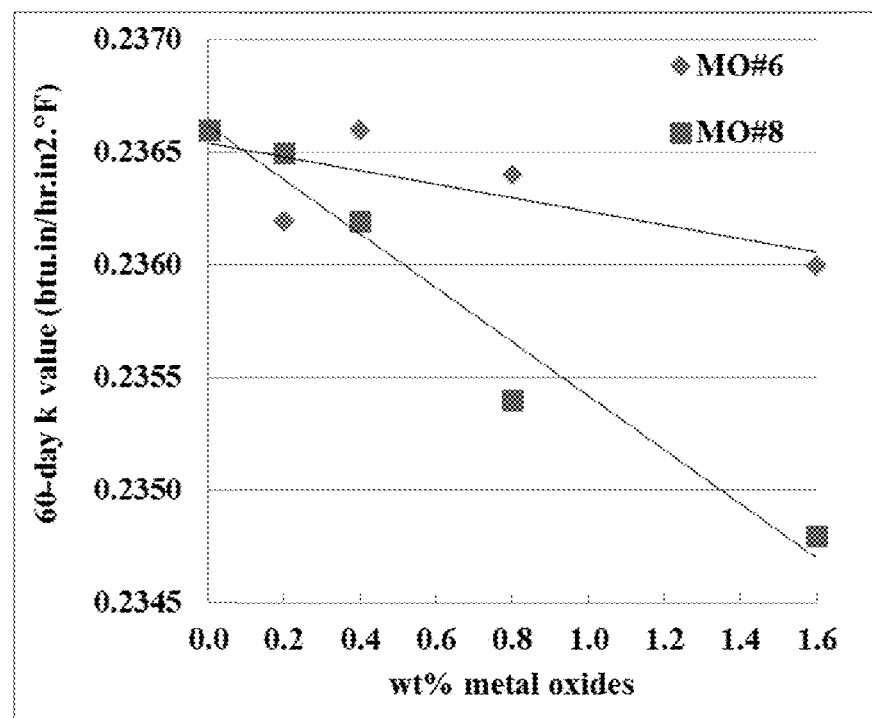
FIG. 5 graphically illustrates the thermal conductivity of exemplary XPS foams including metal oxide IAA blends.

The results of thermal conductivity testing are shown in FIG. 5. As can be seen, the thermal conductivity decreases with increasing concentration of both MO #6 and MO #8 metal oxide IAA blends. Blend MO #6 has less decrease in thermal conductivities compared to blend MO #8, consistent with their infrared absorption capabilities. When metal oxide IAAs cover the same wavelength region of infrared absorption, the metal oxide IAA with higher absorption intensity will absorb more IR radiation and, hence, provide a lower thermal conductivity for the XPS foam containing that metal oxide IAA.

Example 3: Polystyrene Foam Containing Metal Oxide IAAs with HFCs

Polystyrene foam samples containing two blends of metal oxide IAAs were prepared using the methods described for Example 1; however, for this example, the blowing agent was a 50/50 wt/wt blend of HFC-134a and HFC-152a. Metal oxide IAA blend MO #3 from Example 1 and two other metal oxide IAA blends were used in the foam samples. The composition of each metal oxides blend is shown in Table 6.

TABLE 6

| Components | Blend MO#3 (wt. %) | Blend MO#11 (wt. %) | Blend MO#17 (wt. %) |
|---|---|---|---|
| Bismuth Oxide | | 5 | |
| Silicon Dioxide | 20 | 20 | 40 |
| Magnesium Oxide | 40 | 15 | |
| Iron(III) Oxide | 20 | 20 | 20 |
| Molybdenum Oxide | | 10 | |
| Calcium Oxide | 3 | | |
| Zirconium(IV) Oxide | 4 | 10 | |
| Titanium(IV) Oxide | 10 | | |
| Aluminum Oxide | | 15 | |
| Manganese(IV) Oxide | 3 | 5 | 40 |

By following similar formulation and processing conditions as described in example 1, the three blends MO #3, MO #11, and MO #17 were added to the XPS foam samples at two levels (0.4 and 0.8 wt. %). The compositions and certain properties for the sample foams are included in Table 7.

TABLE 7

| Composition # | Talc MB (wt. %) | Blend MO#3 (wt. %) | Blend MO#11 (wt. %) | Blend MO#17 (wt. %) | HFCs 134a/152a (wt. %) | Density (pcf) | cell size (mm) | cell x:z | Open Cell % | Compressive Strength (psi) |
|---|---|---|---|---|---|---|---|---|---|---|
| Control 4 | 1.2 | 0 | 0 | 0 | 7.8 | 2.14 | 0.14 | 0.87 | 0.75 | 52.89 |
| Example 18 | 0.9 | 0.4 | | | 7.8 | 2.03 | 0.16 | 1 | 0.52 | 46.48 |
| Example 19 | 0.9 | | 0.4 | | 7.8 | 2.02 | 0.16 | 1 | 0 | 44.75 |
| Example 20 | 0.9 | | | 0.4 | 7.8 | 2.01 | 0.16 | 1 | 0 | 45.02 |
| Example 21 | 0.6 | | | 0.8 | 7.8 | 1.98 | 0.17 | 1 | 0.02 | 42.69 |

Figure 6:
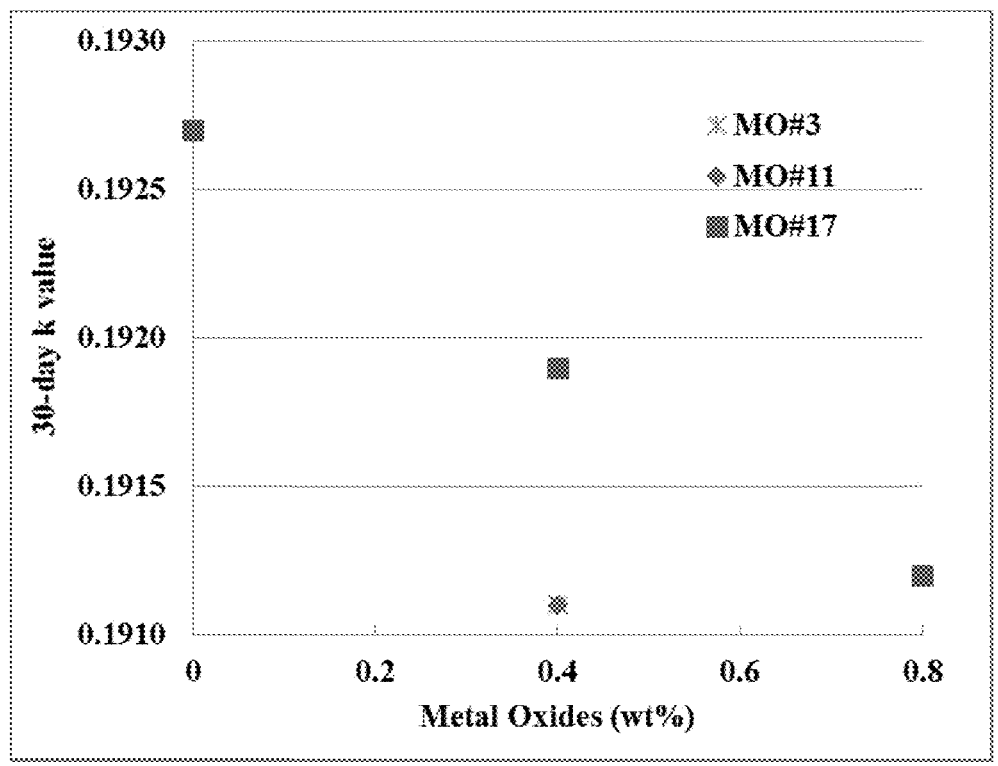
FIG. 6 graphically illustrates the thermal conductivity of exemplary XPS foams including metal oxide IAA blends and formed with HFC blowing agents.

The results of thermal conductivity testing are shown in FIG. 6. Again, the thermal conductivity was found to decrease with increasing concentration of each metal oxide IAA blend when using HFCs as blowing agents.

Metal oxide IAA blends at concentrations around 0.4 wt. % were shown to reduce thermal conductivity by 0.00~10.003 BTU·in/hr·ft$^2$·° F., depending on the components of the metal oxide IAA blend. When used in an XPS foam with an R value of 5/in or a k value of 0.2 BTU·in/hr·ft$^2$·° F., this reduction is about 0.5 to 1.5% of total thermal conductivity. This degree of thermal conductivity reduction is traditionally obtained either by increasing the foam density by about 0.2 pcf for a 1.5 pcf density foam, or by using about 1 to 2 wt. % more blowing agent over the normal usage of about 8 wt. %, which increases costs of raw materials by about 10%. For a PS foam with an R value of 4.2/in (0.2381 BTU·in/hr·ft$^2$·° F.) without the application of insulation blowing agents (HFCs or HFOs), as happens in the manufacture of EPS foams, the thermal conductivity improvement from using metal oxide IAA blends will be even more significant. In these applications, metal oxide IAA blends can help realize about 3 to 8% of the necessary reduction from 0.2381 to 0.2 BTU·in/hr·ft$^2$·° F. to improve the R-value of an insulating board from R 4.2/in to R 5.0/in, as required in the specification and building codes.

The complete disclosure of all patents, patent applications, and publications, and electronically available materials cited herein are incorporated by reference. The foregoing detailed description and examples have been given for clarity of understanding only. No unnecessary limitations are to be understood therefrom. In particular, any theories of operation presented herein are optional and the inventors are therefore not bound by theories described herein.

What is claimed is:

1. An insulating polymer foam comprising:
   a polymeric foam composition formed from a foamable polymer composition comprising:
   a) a polymer, and
   b) a blowing agent composition,
   wherein the insulating polymer foam further comprises from 0.1 to 3 wt. % of an inorganic infrared attenuation agent blend, based upon the total weight of the insulating polymer foam, the inorganic infrared attenuation agent blend comprising two or more metal oxides selected from the group consisting of silicon dioxide, manganese (IV) oxide, iron (III) oxide, bismuth (III) oxide, cobalt oxide, zirconium (IV) oxide, molybdenum (III) oxide, titanium oxide, and calcium oxide, and
   wherein the insulating polymer foam further comprises one or more organic compounds.

2. The insulating polymer foam of claim 1, wherein the one or more organic compounds comprise one or more polysaccharides.

3. The insulating polymer foam of claim 2, wherein the one or more polysaccharides comprise a cellulose, a starch, or combinations thereof.

4. The insulating polymer foam of claim 2, wherein the one or more polysaccharides absorb infrared radiation at 1000 cm$^{-1}$.

5. The insulating polymer foam of claim 1, wherein the infrared attenuation agent blend comprises two or more metal oxides selected from the group consisting of silicon dioxide, manganese (IV) oxide, iron (III) oxide, zirconium (IV) oxide, molybdenum (III) oxide, titanium oxide, and cobalt oxide.

6. The insulating polymer foam of claim 1, wherein the infrared attenuation agent blend comprises four or more metal oxides selected from the group consisting of silicon dioxide, manganese (IV) oxide, iron (III) oxide, bismuth (III) oxide, cobalt oxide, zirconium (IV) oxide, molybdenum (III) oxide, titanium oxide, and calcium oxide.

7. The insulating polymer foam of claim 1 wherein the infrared attenuation agent blend comprises, by weight:
   a) 0% to 10% of metal oxides that absorb infrared radiation greater than 1500 cm$^{-1}$;
   b) 10% to 30% of metal oxides that absorb infrared radiation from 1500 cm$^{-1}$ to 1200 cm$^{-1}$;
   c) 20% to 50% of metal oxides that absorb infrared radiation from 1200 cm$^{-1}$ to 800 cm$^{-1}$;
   d) 10% to 30% of metal oxides that absorb infrared radiation from 800 cm$^{-1}$ to 500 cm$^{-1}$; and
   e) 0% to 10% of metal oxides that absorb infrared radiation less than 500 cm$^{-1}$.

8. The insulating polymer foam of claim 1, wherein the infrared attenuation agent blend has an average particle size from 1 μm to 100 μm.

9. A foamable polymer material comprising:
a) a polymer,
b) a blowing agent composition, and
c) from 0.1 to 3 wt. % of an inorganic infrared attenuation agent blend, based upon the total weight of the foamable polymer material, the inorganic infrared attenuation agent blend comprising two or more metal oxides selected from the group consisting of silicon dioxide, manganese (IV) oxide, iron (III) oxide, bismuth (III) oxide, cobalt oxide, zirconium (IV) oxide, molybdenum (III) oxide, titanium oxide, and calcium oxide, and
wherein the foamable polymer material further comprises one or more organic compounds.

10. The foamable polymer material of claim 9, wherein the one or more organic compounds comprise one or more polysaccharides.

11. The foamable polymer material of claim 10, wherein the one or more polysaccharides comprise a cellulose, a starch, or combinations thereof.

12. The foamable polymer material of claim 10, wherein the one or more polysaccharides absorb infrared radiation at $1000 \text{ cm}^{-1}$.

* * * * *